Dec. 29, 1970   W. N. HISTED   3,551,261
HEAT SEALING AND CUTTING MEMBER FOR HEAT
SEALING OVERLYING FILMS OF MATERIAL
Filed Sept. 20, 1968   3 Sheets-Sheet 1

INVENTOR.
WILLIAM N. HISTED
BY

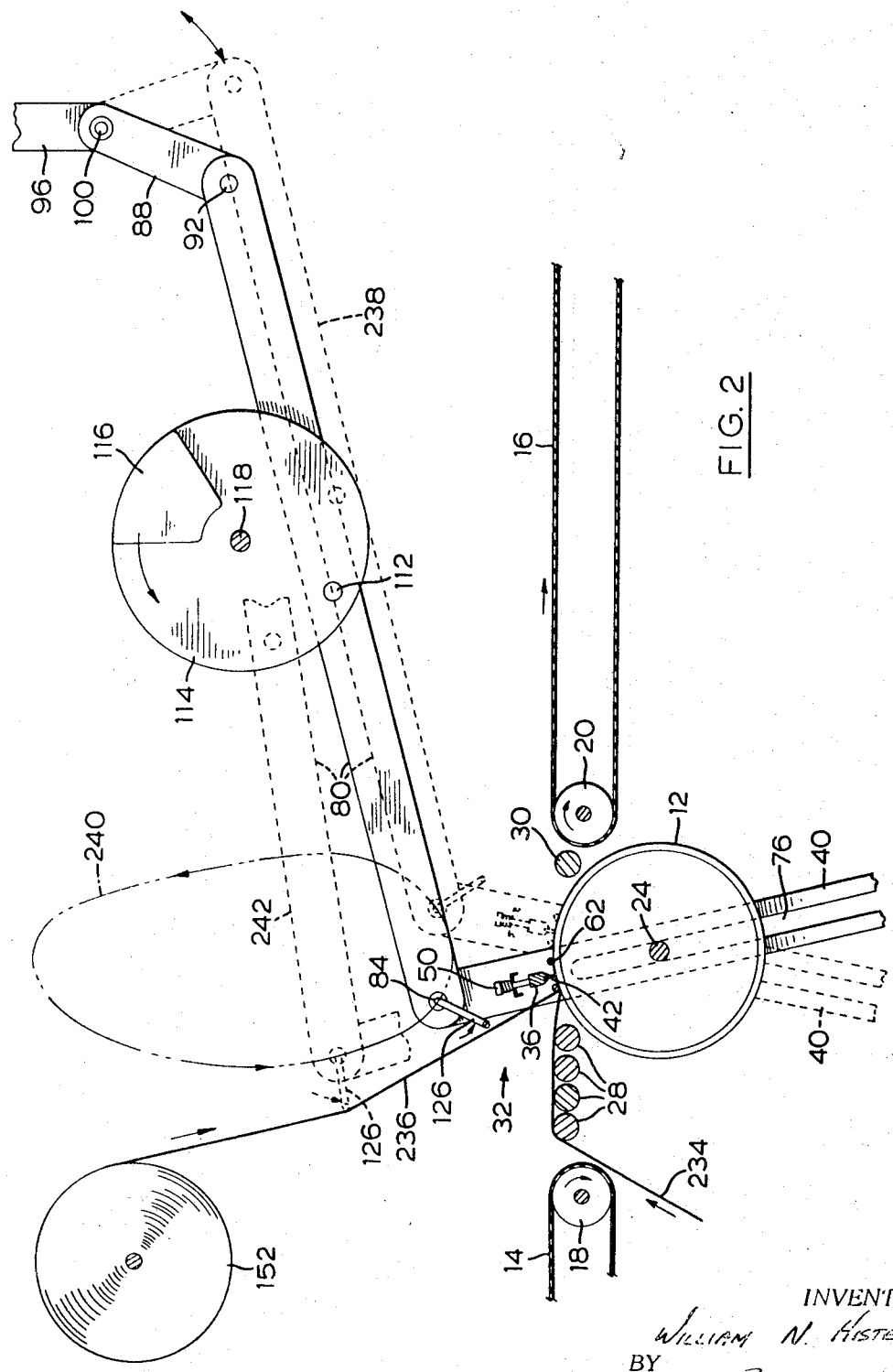

Dec. 29, 1970  W. N. HISTED  3,551,261
HEAT SEALING AND CUTTING MEMBER FOR HEAT
SEALING OVERLYING FILMS OF MATERIAL
Filed Sept. 20, 1968  3 Sheets-Sheet 3
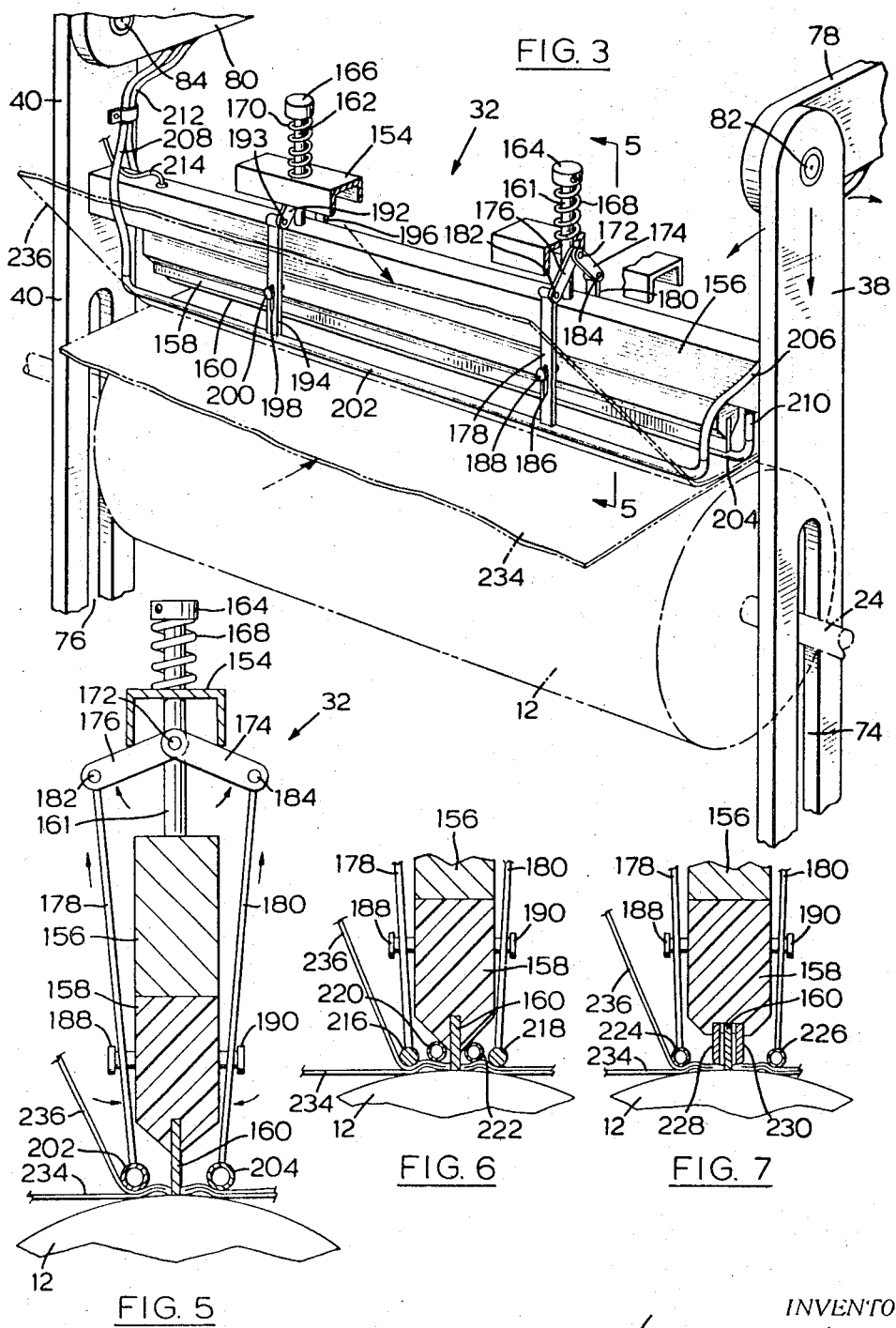
INVENTOR.
WILLIAM N. HISTED
BY > United States Patent Office 3,551,261
Patented Dec. 29, 1970

3,551,261
HEAT SEALING AND CUTTING MEMBER FOR HEAT SEALING OVERLYING FILMS OF MATERIAL
William N. Histed, 89 Empress Ave., Hamilton, Ontario, Canada
Filed Sept. 20, 1968, Ser. No. 761,188
Int. Cl. B32b *31/20;* B30b *15/34*
U.S. Cl. 156—583                              8 Claims

ABSTRACT OF THE DISCLOSURE

A heat sealing device for heat sealing films of heat sealable material together comprises a heat sealing blade having a film-contacting heat sealing edge and a movable shield located adjacent the blade. The shield is movable from a first position in which it extends beyond the heat sealing edge to a second position in which the heat sealing edge is exposed. In operation, the shield prevents unintentional contact between the heat sealing edge and a film to be sealed using the blade.

---

This invention relates to a heat sealing and cutting member useful for heat sealing and cutting films of the heat sealable type, such as polyethylene and polypropylene.

It is known that a pair of films made of a material such as polyethylene or polypropylene may be sealed together effectively by the application of suitable amounts of heat and pressure. Heat sealable films of this type have desirable properties such as relatively high strength (as compared with paper of the same thickness), transparency and impermeability to water. Consequently such heat sealable films have been employed for the manufacture of bags and similar containers.

Commonly used apparatus for the manufacture of bags or containers of heat sealable films includes a conveyor system for conveying a pair of heat sealable films positioned one on top of another to a heat sealing and cutting station. A reciprocating sealing and cutting blade is provided at the station and is heated to a suitable temperature. The conveyor system conveys a predetermined amount of the films, which usually have been previously sealed or otherwise joined together at one side, beyond the sealing and cutting station. This predetermined amount of the films is sufficient to construct one bag. When this predetermined amount of the films is in position, the conveyor system and hence the films stop. The sealing and cutting blade then descends upon and across the upper film while it is at rest, and pressure is applied to the films between the conveyor system and the blade. The result of this pressure and the heat of the blade is to seal the upper and lower films together. If sufficient heat and pressures are employed, the result is to cut the films as well as to seal the films on either side of the cut. The blade then reciprocates upwardly and assumes its original position. As soon as the blade is withdrawn from contact with the film, the conveyor system moves forward again placing another predetermined amount of the films beyond the cutting and sealing station, and the operation is repeated. The completed bags are withdrawn from the apparatus by a conveyor.

A serious disadvantage of such an apparatus is the time consumed in making each bag. A large proportion of the time consumed is that which occurs as a result of the stoppage of the conveyor, the apparatus operating in regular intervals rather than continuously.

In addition, heat sealable films such as a polyethylene and polypropylene can be printed. Bags or containers constructed of such films commonly carry printed advertising matter or other printed matter, such as instructions for the use of an article which may be packaged therein. It has been common practice to print such matter on a continuous roll of the film, the printed matter being duplicated on each section of the continuous film from which a bag is to be made. The printed roll then has been conveyed to a bag-making machine such as the one previously mentioned. Because of the great disparity between the speed of operation of the printing press, which is relatively fast, and the relatively lower speed of operation of the bag-making machine, it has not been possible to lead the film directly from the printing press to the bag-making machine.

In Canadian Pat. No. 651,984 issued Nov. 13, 1962, to William N. Histed and entitled "Heat Sealing and Cutting Apparatus" there is described and claimed a heat sealing apparatus which overcomes the problems attendant upon the prior art apparatus by operating in a continuous manner. One embodiment of this apparatus consists of a supporting means adapted to support upper and lower heat sealable films at a sealing position with the upper film lying on top of the lower film, and heat sealing means above the supporting means at the sealing position. The heat sealing means consists of a pivotably mounted sealing blade that is rotatable about an axis, means for completely rotating the sealing blade about such axis, and means for heating the sealing blade to a heat sealing temperature. The heat sealing blade is positioned such that during a portion of a rotation it is adapted to lie across and firmly contact the upper heat sealable film. The temperature of the heat sealing blade and the pressure between it and the supporting means is sufficient to heat seal the upper and lower films together.

It is an object of the present invention to provide an improved heat sealing and cutting member primarily for use with heat sealing equipment of the continuous operating type but which may be used with heat sealing equipment of other types.

Other objects of the invention will become apparent from the description which follows with reference to the accompanying drawings, in which:

FIG. 2 is a side elevational view of the apparatus of FIG. 1 with parts removed for clarity;

FIG. 3 is a close-up perspective view of a further apparatus embodying the present invention;

FIG. 5 is a sectional view of a further heat sealing and cutting blade in accordance with the present invention taken along line 5—5 of FIG. 3;

FIG. 6 is an alternative embodiment, in section, of the heat sealing and cutting blade shown in FIG. 5; and FIG. 7 is another alternative embodiment, in section, of the heat sealing and cutting blade shown in FIG. 5.

Figures 1, 4:
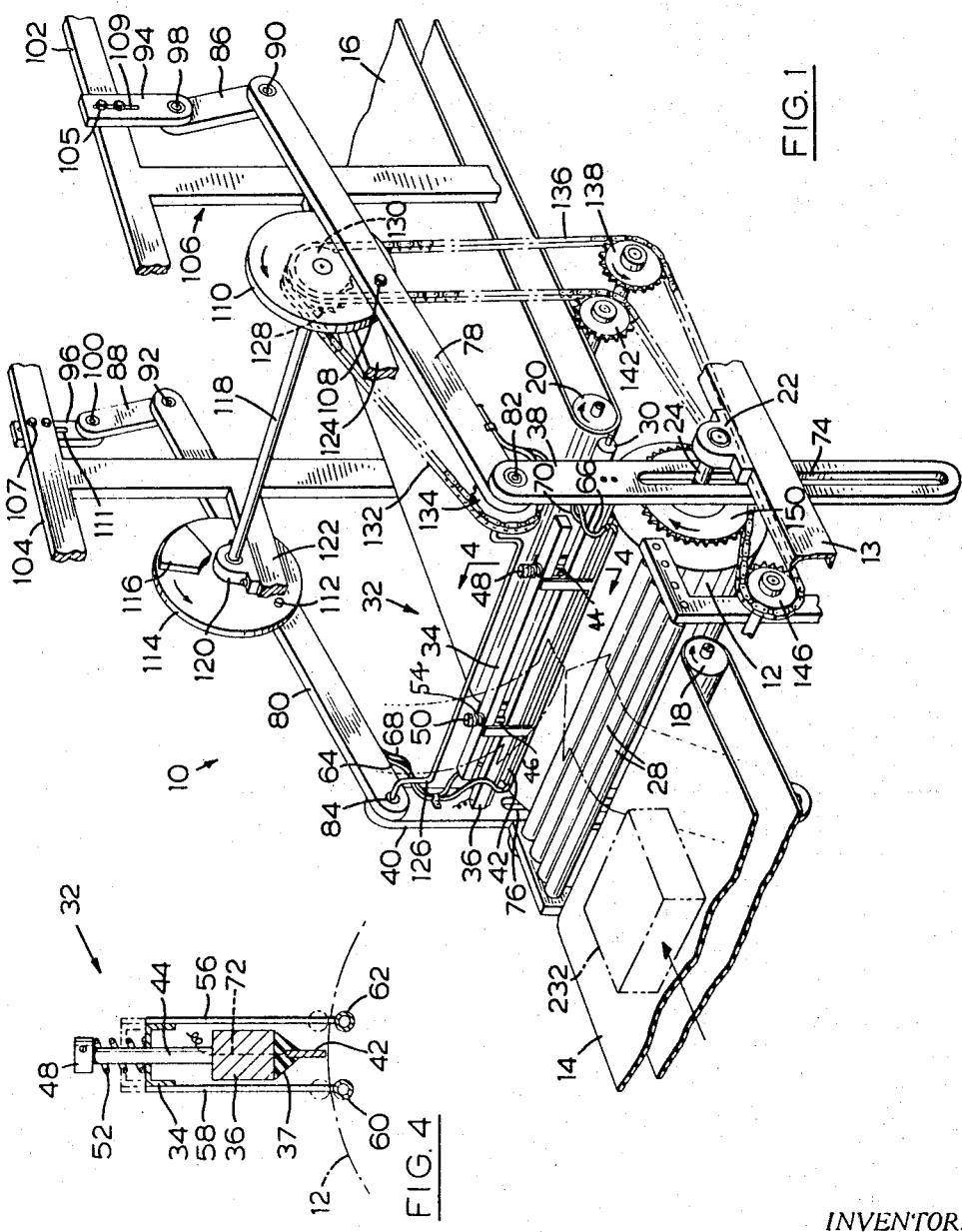
FIG. 1 is a perspective view of apparatus embodying the present invention.
FIG. 4 is a sectional view of a heat sealing and cutting blade in accordance with the present invention taken along line 4—4 of FIG. 1.

In the drawings, referring particularly to FIGS. 1, 2 and 4, a heat sealing and cutting apparatus 10 consists of a roller 12 rotatably mounted between two longitudinal members 13 (only one of which is shown) of a frame 106. The roller 12 is mounted between the ends of the two longitudinally aligned conveyor belts 14 and 16 having driven rollers 18 and 20 respectively, the drives for these rollers not being shown. The roller 12 is mounted on each longitudinal member 13 by means of a bearing 22 and the shaft 24 of roller 12 is journalled in bearings 22. A series of freely rotatable rollers 28 constituting a transfer table are mounted between the end of conveyor 14 and roller 12 and a freely rotatable roller 30 is mounted between roller 12 and conveyor 16. Rollers 18, 28, 12, 30 and 20 are arranged to have a common tangent.

A heat sealing and cutting member generally indicated at 32 is provided. The construction of the heat sealing and cutting member constitutes the present invention. The remainder of the apparatus forms no part of the present invention per se and is claimed in copending application Ser. No. 760,871 filed Sept. 19, 1968, and entitled "Heat Sealing Apparatus."

Heat sealing and cutting member 32 consists of an elongated inverted channel member 34 and an elongated blade supporting member 36. The support member 36 is fixed at both ends to upwardly projecting arm members or straddle bars 38, 40. A blade member 42 is fixed to the support member 36 and is embedded in electrical insulating material 37. Rods 44, 46 attached to blade supporting member 36 pass upwardly through the channel member 34 and terminate in heads 48, 50 respectively of larger diameter than the rods. Positioned between heads 48 and 50 and the upper surface of the channel member 34 are compression springs 52 and 54 respectively shown in their normally uncompressed position in FIG. 4. Welded or otherwise attached to the channel member 34 adjacent each rod 44, 46 are a pair of downwardly projecting arms 56, 58 which terminate at their lower ends in two elongated tube members 60, 62 which are parallel to the blade member 42. Tube members 60 and 62 have water or other cooling liquid flowing therethrough when the apparatus is in operation, and this cooling liquid is fed through pipes 64, 66 and 68, 70 respectively. The blade member 42 is heated electrically and is connected to a suitable power supply (not shown) by conductors 72 only one of which is shown in FIG. 4.

The instant invention is directed to the heat sealing and cutting member and not to the apparatus for moving heat sealing and cutting apparatus 32, which now will be described. The arms 38, 40 each are constructed with an elongated slot 74, 76 respectively through which shaft 24 extends. At their upper ends each of arms 38, 40 is pivotally connected to lever arms 78, 80 by pivot pins 82, 84 respectively. Each of lever arms 78, 80 is pivotally connected to a link 86, 88 by means of pivot pins 90, 92 respectively. In turn, links 86, 88 are pivotally connected to adjustable bracket members 94, 96 by pivot pins 98, 100 respectively. The adjustable bracket members 94, 96 are bolted to longitudinal members 102, 104 of frame 106 by bolts 105, 107 that pass through slots 109, 111 formed in the bracket members 94, 96 respectively.

At a point intermediate pivot pins 82 and 90, lever arm 78 is connected by means of a pivot pin 108 to a crank wheel 110. Lever arm 80 is similarly connected by means of a pivot pin 112 to a crank wheel 114. Each of crank wheels 110, 114 is provided with a counterweight 116 (only one of which is shown in FIGS. 1 and 2) opposite pivot pins 108 and 112 respectively. Crank wheels 110, 114 are fixed on each end of a shaft 118 which is journalled adjacent crank wheel 114 in a bearing 120. Shaft 118 is similarly journalled adjacent crank wheel 110 in a bearing (not shown). Bearing 120 is fixed to a further longitudinal member 122 of frame 106. The other bearing is fixed to a longitudinal member 124 of frame 106. Constituting pivot pins 82 and 84 and extending between straddle bars 38, 40 is a cranked rod 126. Fixed to shaft 118 adjacent crank wheel 110 are a pair of cog wheels 128, 130 shown in dotted outline in FIG. 1. Cog wheel 128 is connected by a chain 132 to a further cog wheel 134 fixed to cranked rod 126 adjacent lever arm 78. Cog wheel 130 is connected by a chain 136 to a cog wheel 138 fixed on the drive shaft 140 of a gear reduction unit (not shown) of an electric motor (not shown). Chain 136 also passes around an idler cog wheel 146 secured on a shaft 148, the shaft 148 being rotatably mounted in a bearing (not shown) fixed to an upright member (not shown) of the frame 106. Chain 136 also engages a gear wheel 150 integral with the roller 12 and passes over an idler cog wheel 142. Chain 136 also may pass over a cog wheel connected to roller 18 to drive this roller. The shaft 148 also may have mounted thereon pulleys or cog wheels whereby belts or chains may drive reels of heat sealable film such as reel 152 shown schematically in FIG. 2.

Turning now to the modification of FIGS. 3 and 5, like reference numerals have been used to indicate the same elements as are illustrated in FIGS. 1, 2 and 4. The modification illustrated in these figures concerns primarily the construction of the heat sealing and cutting member 32 of the present invention. The cranked rod 126 has been omitted from the apparatus of FIG. 3 for the sake of simplicity. In the modification of FIGS. 3 and 5 the heat sealing and cutting member consists of an inverted channel member 154 (partially cut away for clarity) and an elongated blade supporting member 156 fixed to the straddle bars 38, 40 and to which is attached an elongated electrical insulator 158. Embedded in the insulator 158 is a heat sealing and cutting blade 160. A pair of rods 160, 162 pass upwardly from the blade supporting member 156 through the channel member 154 and terminate in heads 164, 166 of larger diameter than rods 160, 162. Positioned between the channel member 154 and the heads 164, 166 are compression springs 168, 170 respectively. A pivot pin 172 is fixed to rod 160 between the underside of the channel member 154 and the blade supporting member 156. Pivotally mounted on pivot pin 172 are links 174, 176. To the outer extremities of links 174, 176 are pivoted downwardly projecting arms 178, 180 by means of pivot pins 182, 184 respectively. Each of arms 178, 180 is provided with an elongated slot, only one of which, 186, formed in arm 178 is shown in FIG. 3. An identical slot is formed in arm 180. Headed pins 188, 190 are secured to insulator 158 and pass through the slots formed in the arms 178, 180 respectively. A similar arrangement of arms, pivot pins, links and headed pins is associated with rod 162, only partially shown in FIG. 3 as link 192, pivot pin 193, arms 194, 196, slot 198 and headed pin 200. Arms 178, 194 terminate at their lower end in an elongated tube member 202. Arms 180, 196 terminate at their lower end in an elongated tube member 204. Tube members 202, 204 are parallel to the blade member 160 and have water or other cooling liquid flowing therethrough when the apparatus is in operation. This cooling liquid is fed to tube members 202, 204 by pipes 206, 208 and 210, 212 respectively. The blade member 160 is heated electrically and is connected to a suitable power supply by conductors 214 (only one shown).

In the embodiment of FIG. 6, there is shown in modification of the lower end of the heat sealing and cutting member shown in detail in FIG. 5. Like reference numerals to describe like elements to those of FIG. 5 are used where appropriate. Arms 178, 180 terminate in solid rods 216, 218 which extend parallel to the cutting and sealing blade 160 in like manner to pipes 202, 204 in FIG. 5. Located adjacent the blade 160 are pipes 220, 222 which run parallel to the blade 160 throughout its length and parallel to rods 216, 218. (Pipes 220, 222 are adapted to carry cooling liquid such as water.) The cooling liquid is fed to the pipes 220, 222 in the same manner as cooling liquid is fed to pipes 202, 204 in FIG. 3.

In FIG. 7 a further modification of the structure shown in FIG. 5 is illustrated. Like reference numerals to describe like elements to those of FIG. 5 are used where appropriate. Arms 178, 180 terminate in coolant tubes 224, 226 which extend parallel to the cutting and sealing blade 160 in like manner to the pipes 202, 204 in FIG. 3. Located on either side of the blade 160 parallel thereto and co-extensive therewith are two heat sealing blades 228, 230. The blades 228, 230 are slightly shorter than blade 160 and may be corrugated in configuration to give a wider and better seal than a straight line seal.

Blade 160 is directly electrically heated by means not shown, whereas the blades 228, 230 are heated indirectly by the blade 160. The effect of this indirect heating is that blades 228, 230 only seal films with which they come into contact and do not cut them, whereby the width of the seal may be increased.

In operation, firstly with reference to the apparatus illustrated in FIGS. 1, 2 and 4, an item to be packaged, such as that indicated as 232 and appearing in chain outline, is fed by conveyor 14 onto rollers 28. Also fed onto rollers 28 from beneath and through the gap between the conveyor 14 and rollers 28 is a film of heat sealable material 234 (see FIG. 2) not shown in FIG. 1 but indicated by a broad arrow. The item 232 thus sits on the film. A further film of heat sealable material 236 (not shown in FIG. 1 but indicated by a further broad arrow) is fed from reel 152 (not shown in FIG. 1) towards the heat sealing and cutting member 32. With the apparatus in the position indicated in FIGS. 1 and 2 sealing together and cutting of the films occurs. Thus, assuming that one article to be packaged is beyond the heat sealing and cutting member 32, say on conveyor 16, and a second article is located on rollers 28, the films 234 and 236 are held in contact with each other by pipes 60, 62, which cool the film in that area by the passage of cooling liquid therethrough. Heated blade 42 melts the films in the area beneath the blade and cuts through them. Since this operation is not instantaneous, provision must be made to hold the cutting and sealing blade 42 in contact with the films for a short time while the roller 12 is continuously rotating in response to movement of drive shaft 140 transmitted to roller 12 through cogs 150, 142 and chain 144. This dwell time is provided by pivotal movement of links 86, 88 about pivot pins 98, 100 (see FIG. 2). As crank wheels 110, 114 rotate in the direction of the arrows in response to movement of drive shaft 140, lever arms 78, 80 pivoting about pins 108, 112 causes pivotal movement of arms 38, 40, and thus of the heat sealing and cutting member 32 secured thereto about pivot pins 82, 84. Links 86, 88 pivot about pivot pins 98, 100 during movement of lever arms 78, 80. This movement occurs between the position shown in solid line in FIG. 2 and the position shown in dotted line generally indicated as 238 in FIG. 2. Since the support member of the heating and cutting member 32 is fixed to the straddle bars 38, 40, the blade 42 is held in contact with the films as the roller 12 moves. The time during which the blade 42 is held in contact with the films is predetermined and in sufficient to effectively seal the films together and to cut the films between the seal. It may be desired simply to seal the films rather than to cut and seal them.

This may be achieved by adjusting the temperature of the blade or the pressure exerted on the films between the blade and roller 12. Adjustment of the apparatus to achieve different pressures will be described later.

While the heat sealing and cutting member 32 is in its sealing and cutting position as shown in FIGS. 1 and 2, the tubes 60, 62 and arms 56, 58 are forced upwardly by the roller 12, thereby compressing springs 52, 54 between inverted channel 34 and heads 48, 50. In the normal uncompressed position of compression springs 52, 54 tubes 60, 62 project below the level at which they would be were roller 12 contacting them and below the level of the blade 42. This is illustrated by the chain outline of the roller 12 in FIG. 4. When the springs are compressed, pipes 60, 62 and the channel 34 assume the position shown in dotted outline in FIG. 4. The pipes then hold the films firmly in contact with the roller 12 during the sealing and cutting operation and relieve any tension in the part of the films being sealed and cut that might otherwise occur by movement of the previously sealed object away from the heat sealing and cutting station. Projection of the pipes 60, 62 below the level of the blade 42 acts to prevent premature contact between the blade and upper film 236 as film 236 passes beneath the blade prior to assumption of the desired sealing position in contact with roller 12.

As the crank wheels 110, 114 continue to rotate, the lever arms 78, 80 are raised, as are straddle bars 38, 40. Eventually pivot pins 82, 84 reach a point of maximum elevation above the roller 12 and then descend to the original position shown in full line in FIG. 2. As the lever arms 78, 80 are raised and lowered and the straddle bars 38, 40 are raised and lowered, links 86, 88 pivot backwards and forwards about pivot pins 98, 100, pivot pins 90, 92 describing the arc of a circle during such movement. The pivot pins 82, 84 follows substantially the path of an ellipse, as is indicated by the chain line 240. The extremities of the major axis of the ellipse are the points of closest and farthest approach of the pivot pins 82, 84 to the roller 12. The position of the arm 80, and straddle bar 40 in an intermediate position are shown fragmentarily in the broken line 242. As the straddle bars 38, 40 rise, heat sealing and cutting member 32 rises allowing the films together with the material packaged therebetween to be conveyed by roller 12 onto conveyor 16. The heat sealing and cutting member 32 returns to its sealing and cutting position when a predetermined interval in which the article to be packaged has passed has elapsed and the films required to be sealed and cut have been conveyed into position. It will be seen that because of the elliptical path followed by the pivot pins 82, 84, bulky objects may be packaged between the films without the sealing and cutting member 32 accidentally engaging the object to be packaged. This is in contrast to the apparatus described in the aforementioned Canadian Pat. No. 651,984 where, due to circular movement of the sealing and cutting blade, the height of articles which may be packaged in a tight package is limited. The shape of the ellipse may be varied in the manner hereinafter described.

During operation cog wheel 128 rotates, and cranked rod 126, is rotated via cog 134 and chain 132. The cranked rod 126 serves to prevent the film 236 from engaging the side of the sealing and cutting element 32 during downward movement of the element 32. The film is engaged by the cranked rod 126 and by the tube 60. The operation of cranked rod 126 is illustrated in the broken line outline 242. This cranked rod may be omitted, such as in the apparatus illustrated in FIG. 3, depending on the angle at which the film 236 approaches the roller 12. If the angle is so steep that the side of member 32 would foul the film 236 then rod 126 should be employed. If the angle is not so steep, then the rod may be omitted. Cranked rod 126 has an additional use. It is well known that heat sealable films such as polyethylene and polypropylene readily pick up static electricity which may be undesirable. The cranked rod 126 may be coated with an antistatic material so that the static is removed from the film 236 by wiping of the rod 126 against the film, and, to this end, rod 126 may be grounded.

Turning now to the operation of the apparatus of FIGS. 3 and 5, this operates in identical manner to the apparatus of FIG. 1 with the exception of the operation of the heat sealing and cutting member 32, and, therefore, only the action of the sealing and cutting member will be described. As has already been noted, the apparatus illustrated in FIG. 3, does not include the cranked rod 126. This may, of course, be included in the embodiment of FIG. 3 if desired either to prevent fouling of the sealing and cutting member 32 by the film 236 or to remove static electricity from the film, or both.

The heat sealing and cutting member 32 is shown in a compressed position in FIG. 5 with compression spring 168 in compression between the head 164 and the channel member 154. Spring 170 is similarly in compression between head 166 and the channel member 154. The compression of spring 168 is caused by the upward pressure of the roller 12 on the arms 178, 180. In the relaxed position arms 178, 180 hang substantially parallel to each other and extend downwardly below the level of the blade 160 in similar manner to arms 56 and 58 in FIG. 4. The upward pressure on the arms causes the links 174, 176 to pivot about the pivot 172 while arms 178, 180 pivot about pivot pins 182, 184. Links 176, 174 bear against the downwardly projecting sides of the inverted channel member 154, thereby causing compression of spring 168. As a result of the foregoing movements, tubes 202, 204 move towards each other. Movement of the tubes 202, 204 towards each other has the effect of releasing tension present in the films being seated together. This gives a more efficient seal and allows the films to be readily cut. It will be understood that the links and arms associated with rod 162 operated in the same way as the links and arms associated with rod 160.

As in the case of the apparatus illustrated in FIG. 4, when the tubes 202, 204 no longer engage the films in contact with the roller 12, springs 168, 170 return the arms to their normal position parallel to each other, and the tubes 202, 204 serve to prevent premature contact between the film 236 and the blade 160.

The heat sealing and cutting member illustrated in FIG. 6 has an identical operation to that of the member shown in FIG. 5 with the exception that it is the solid rods 216, 218 attached to the lower end of arms 178, 180 which move towards each other releasing tension in the films. The cooling pipes 220, 222 serve only to cool the film adjacent the blade 160 so that a so-called "rotten seal" is avoided.

The heat sealing and cutting member illustrated in FIG. 7 has an identical operation to that of the member shown in FIG. 6 with coolant tubes 224, 226 moving towards each other to relieve tension in the films. The use of three blades 160, 228 and 230 has the effect of providing a wider seal. As indicated above, only blade 160 is directly heated, and this blade both seals and cuts the films, whereas blades 228 and 230 are heated indirectly by blade 160 and only seal the films but do not cut them. Of course, if desired, blades 228 and 230 also can be connected to a series of electrical energy and heated directly rather than by heat transfer from blade 160.

As in the case of FIG. 5, when the rods 216, 218 in FIG. 6 and tubes 224, 226 in FIG. 7 no longer engage the films in contact with the roller 12, arms 178, 180 assume a position parallel to each other. The rods then serve to prevent premature contact between the film 236 and the blade 160.

Various adjustments may be made to the apparatus to suit individual requirements as will now be discussed.

The pressure exerted by the sealing and cutting element 32 on the films on roller 12 at the sealing and cutting station may be adjusted by adjusting the position of bracket members 94, 96 on frame 106. In the arrangement illustrated in FIG. 1, if the bracket members 94, 96 are raised, the pressure exerted by the sealing and cutting member 32 will increase, and if bracket members 94, 96 are lowered, the pressure exerted will decrease. In this way, the pressure on the films at the cutting and sealing station can be adjusted to achieve the desired requirements.

Movement of pivot pins 108, 112 radially inwardly on crank wheels 110, 114 respectively and movement of shaft 118 and hence the crank wheels towards sealing and cutting member 32 has the effect of decreasing the height of the path along which the sealing and cutting member 32 travels. Similarly, movement of the pins 108, 112 radially outwardly and movement of shaft 118 away from sealing and cutting member 32 increases the height of the elliptical path 240. Both operations are necessary, i.e. movement of the pivot pins combined with movement of the shaft, to maintain uniform pressure between the sealing and cutting member 32 and roller 12 over the period taken for the sealing and cutting operation.

Modifications are possible to the apparatus illustrated in the drawings, as will be obvious to those skilled in the art.

One such modification consists in removal of lever arms 78, 80 completely together with rod 126, movement of crank wheels 110, 114 to a position over roller 12, and connection of pins 108, 112 to straddle bars 38, 40, pivot pins 108, 112 taking the place of pins 82, 84. This modification represents the extremity of the movement of shaft 118 mentioned in the previous paragraph. In order to maintain uniform pressure, the pins must be moved radially inwardly by a compensatory amount.

A further modification consists in providing a lug fixed to each of crank wheels 110, 114 and projecting radially outwardly therefrom. Pivot pins, such as pivot pins 108, 112 are located at the outer extremities of the lugs and rigid arms are provided extending between these pins and pins 82, 84, these arms being pivoted on pins 82, 84 and the pins of the lugs. Lever arms 78, 80 are disconnected from crank wheels 110, 114 and the end of the lever arms adjacent straddle bars 38, 40 are provided with elongated slots running parallel to the length dimension of the lever arms and through which pins 82, 84 extend. This modification has the effect of increasing the height of travel of the member 32, thereby increasing the height of articles which may be packaged. The same effect could be achieved by using larger crank wheels 110, 114. A compensatory movement of the shaft 118 away from the member 32 is necessary to maintain uniform pressure at the sealing station, as explained above.

The apparatus as described will only seal and cut the ends of the package. The sealing of the sides of the package may be achieved by methods known in the art, such as by the method described in the above-mentioned Canadian Pat. No. 651,984.

Other modifications are possible within the scope of the invention.

What I claim as my invention is:

1. A heat sealing device for sealing films of heat sealable material comprising: a heat sealing blade having a film-contacting heat sealing edge, a movable shield located adjacent said blade and adapted to prevent unintentional contact between said edge and a film to be sealed using said blade, said shield being movable from a first position in which said shield extends beyond said edge to a second position in which said edge is exposed, said shield including members disposed on either side of said blade, each of said members having parts thereof extending beyond said edge when said shield is in said first position, and means for moving said parts towards each other simultaneously with movement of said shield to said second position.

2. A heat sealing device according to claim 1 including biasing means biasing said shield into said first position.

3. A heat sealing device according to claim 2 wherein said biasing means comprises at least one spring.

4. A heat sealing device according to claim 1 wherein said shield includes tubular members disposed on either side of said blade and extending beyond said edge when said shield is in said first position, said tubular members being adapted to contact a film being heat sealed by said blade, and means for supplying a cooling liquid to said tubular members for passage therethrough.

5. A heat sealing device according to claim 4 including means for moving said tubular members towards each other simultaneously with movement of said shield to said second position.

6. A heat sealing device according to claim 1 including additional heat sealing blades located on either side of but spaced from the first-mentioned heat sealing blade and heated by heat transferred from said first-mentioned heat sealing blade.

7. A heat sealing device according to claim 1 wherein said shield comprises a first member located on the side of said blade opposite to said edge and substantially coextensive with said blade, a first arm projecting from said first member and located on one side of said blade and terminating in a first elongated tubular member, and a second arm projecting from said first member and located on the other side of said blade and terminating in a second elongated tubular member, said tubular members being located parallel to and being substantially co-extensive with said blade, said device also including a plurality of rods extending through openings in said first member and having stops thereon, a compression spring mounted on each of said rods between said first member and said stop thereof, and means connecting said rods and said blade.

8. A heat sealing device for sealing films of heat sealable material comprising: a heat sealable blade having a film contacting sealing edge, a movable shield located adjacent said blade and adapted to prevent unintentional contact between said edge and a film to be sealed using said blade, said shield being movable from a first position in which said shield extends beyond said edge to a second position in which said edge is exposed, a holder for said blade, a first member located adjacent said holder on the side of said blade opposite to said edge and substantially co-extensive with said blade, a plurality of rods extending upwardly from said blade holder through openings in said first member and having stops thereon, a compression spring mounted on each of said rods between said first member and said stop thereof, a pivot pin located on each of said rods between said blade holder and said first member, two links pivotally mounted on each of said pivot pins and projecting outwardly therefrom and adapted to engage said first member, said shield including arms pivotally connected to said links, said arms being located on either side of said blade and each terminating in a tubular member, said tubular members being parallel to and co-extensive with said blade, each of said arms having a slot formed therein, and headed pins connected to said blade holder and projecting through the slots in said arms.

References Cited

UNITED STATES PATENTS

| | | | |
|---|---|---|---|
| 2,725,091 | 11/1955 | Miner et al. | 156—583X |
| 3,119,922 | 1/1964 | Mayhew | 156—581X |
| 3,236,174 | 2/1966 | Hutchinson et al. | 156—583X |
| 3,453,801 | 7/1969 | Stohlquist | 156—583X |

BENJAMIN A. BORCHELT, Primary Examiner

J. J. DEVITT, Assistant Examiner